United States Patent
Shankar et al.

(10) Patent No.: US 10,230,584 B1
(45) Date of Patent: Mar. 12, 2019

(54) DYNAMIC MULTITONE SIMULATION SCENARIO PLANNING

(71) Applicant: INPHI CORPORATION, Santa Clara, CA (US)

(72) Inventors: Hari Shankar, Westlake Village, CA (US); Ariel Nachum, Calabasas, CA (US); Ariel Leonardo Vera Villarroel, Northridge, CA (US)

(73) Assignee: INPHI CORPORATION, Santa Clara, CA (US)

( * ) Notice: Subject to any disclaimer, the term of this patent is extended or adjusted under 35 U.S.C. 154(b) by 302 days.

(21) Appl. No.: 15/201,295

(22) Filed: Jul. 1, 2016

(51) Int. Cl.
*H04L 27/34* (2006.01)
*H04L 12/24* (2006.01)

(52) U.S. Cl.
CPC .......... *H04L 41/145* (2013.01); *H04L 27/34* (2013.01)

(58) Field of Classification Search
CPC .......... H03F 1/32; G01R 23/20; G01R 23/16; G01R 31/2848; G06F 17/5045; H04B 2001/0408; H04L 27/2601; H04L 41/14; H04L 27/34; H04L 12/24
See application file for complete search history.

(56) References Cited

U.S. PATENT DOCUMENTS

| 4,633,411 A * | 12/1986 | Bliss | H04B 17/309 702/77 |
| 5,420,516 A * | 5/1995 | Cabot | G01R 23/20 324/620 |
| 2005/0265464 A1* | 12/2005 | Neubert | H03C 3/00 375/260 |

* cited by examiner

*Primary Examiner* — Rahel Guarino
(74) *Attorney, Agent, or Firm* — Richard T. Ogawa; Ogawa P.C.

(57) ABSTRACT

Systems and methods for dynamic multitone simulation scenario planning. A method commences upon accessing a server in a circuit simulation environment to generate a multitone simulation signal to accurately simulate non-linear circuit characteristics. The tones of the multitone simulation signal are derived from a subset of possible tones based on certain properties. Some properties serve to eliminate harmonic and intermodulation products that conflict with the tones in the subset. The amplitude and phase for each tone is determined based on certain constraints. A multitone transient signal is generated from the selected tone subset and associated tone attributes to facilitate a circuit simulation. Characteristics of the multitone transient signal and/or simulation results from the circuit simulation can be analyzed to facilitate dynamically planning simulation scenarios that use multitone simulation signals.

20 Claims, 8 Drawing Sheets

DYNAMIC MULTITONE SIMULATION SCENARIO PLANNING

FIELD

This disclosure relates to the field of circuit simulation and more particularly to techniques for dynamic multitone simulation scenario planning.

BACKGROUND

Circuits with non-linear characteristics are present in many electronic systems. The transistor, the ubiquitous fundamental component of modern electronic systems, exhibits non-linear characteristics. The linear amplifier is referred to as "linear" merely to refer to operating conditions and/or the circuit design aspects that minimize its non-linear effects. For example, the linear amplifier as implemented in high-speed communication (e.g., fiber optic) networks and systems is expected to exhibit accurate (e.g., high linearity, low distortion) amplification of the input data signals over a maximum output signal range. Distortion and/or other non-linear characteristics introduced by the linear amplifier can result in an increase in bit-error-rate (BER) and/or other system performance issues. In some cases, a limited output signal range can limit the ability of the fiber optic system to implement higher orders of multi-level signaling (e.g., PAM-16 having 16-level signaling) to accommodate the continually increasing demand for more data bandwidth over a fixed transmission medium. Designers of linear amplifiers and other circuits with non-linear characteristics use circuit simulators to evaluate the behavior of their circuits under various conditions (e.g., simulation constraints) so as to predict the performance of the circuit in its target environment (e.g., a high speed communication system).

Unfortunately, legacy approaches to simulating non-linear behavior in circuits can present limitations at least as pertaining to efficiently creating simulation scenarios that facilitate accurate predictions of non-linear circuit behavior. Specifically, certain legacy approaches might select a simulation input signal characterized by a single tone (e.g., one frequency) or a dual tone (e.g., two frequencies). In such cases, the simulation time can be short, but the simulation results can be limited. Specifically, a single tone simulation can produce a prediction of total harmonic distortion (THD). However, the THD metric might not be correlated to system performance. Further, a dual tone simulation can produce a prediction of intermodulation distortion (IMD), but the IMD metric might also be limited as to its correlation to system performance. Some legacy approaches use modulated simulation signals to predict an error vector magnitude (EVM) of the circuit. For example, a quadrature amplitude modulation (e.g., 16 QAM) signal corresponding to the end application of the circuit can be used for simulation. However, the simulated EVM of the circuit might be limited in its correlation to the EVM of the system due to such factors as equalization (e.g., amplitude and phase compensation) included in the system. Further, the duration of EVM simulations can be long. Some legacy approaches might use multitone simulation signals. However, selecting the set of tones and other signal attributes (e.g., amplitude, phase, etc.) to accurately predict the performance of the circuit in the target system can be limited.

Techniques are therefore needed to address the problem of efficiently selecting a simulation input signal to accurately predict non-linear characteristics of a circuit as implemented in an electronic system. None of the aforementioned legacy approaches achieve the capabilities of the herein-disclosed techniques for dynamic multitone simulation scenario planning. Therefore, there is a need for improvements.

SUMMARY

The present disclosure provides a detailed description of techniques used in systems, methods, and in computer program products for dynamic multitone simulation scenario planning, which techniques advance the relevant technologies to address technological issues with legacy approaches. More specifically, the present disclosure provides a detailed description of techniques used in systems, methods, and in computer program products for dynamic multitone simulation scenario planning. Certain embodiments are directed to technological solutions for implementing a properties-based tone selection technique to dynamically generate a multitone simulation signal to accurately simulate non-linear circuit characteristics.

The disclosed embodiments modify and improve over legacy approaches. In particular, the herein-disclosed techniques provide technical solutions that address the technical problems attendant to efficiently selecting a simulation input signal to accurately predict non-linear characteristics of a circuit as implemented in an electronic system. Such technical solutions can serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance circuit design as well as advances in various technical fields related to circuit simulation.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

DETAILED DESCRIPTION

Figure 1:
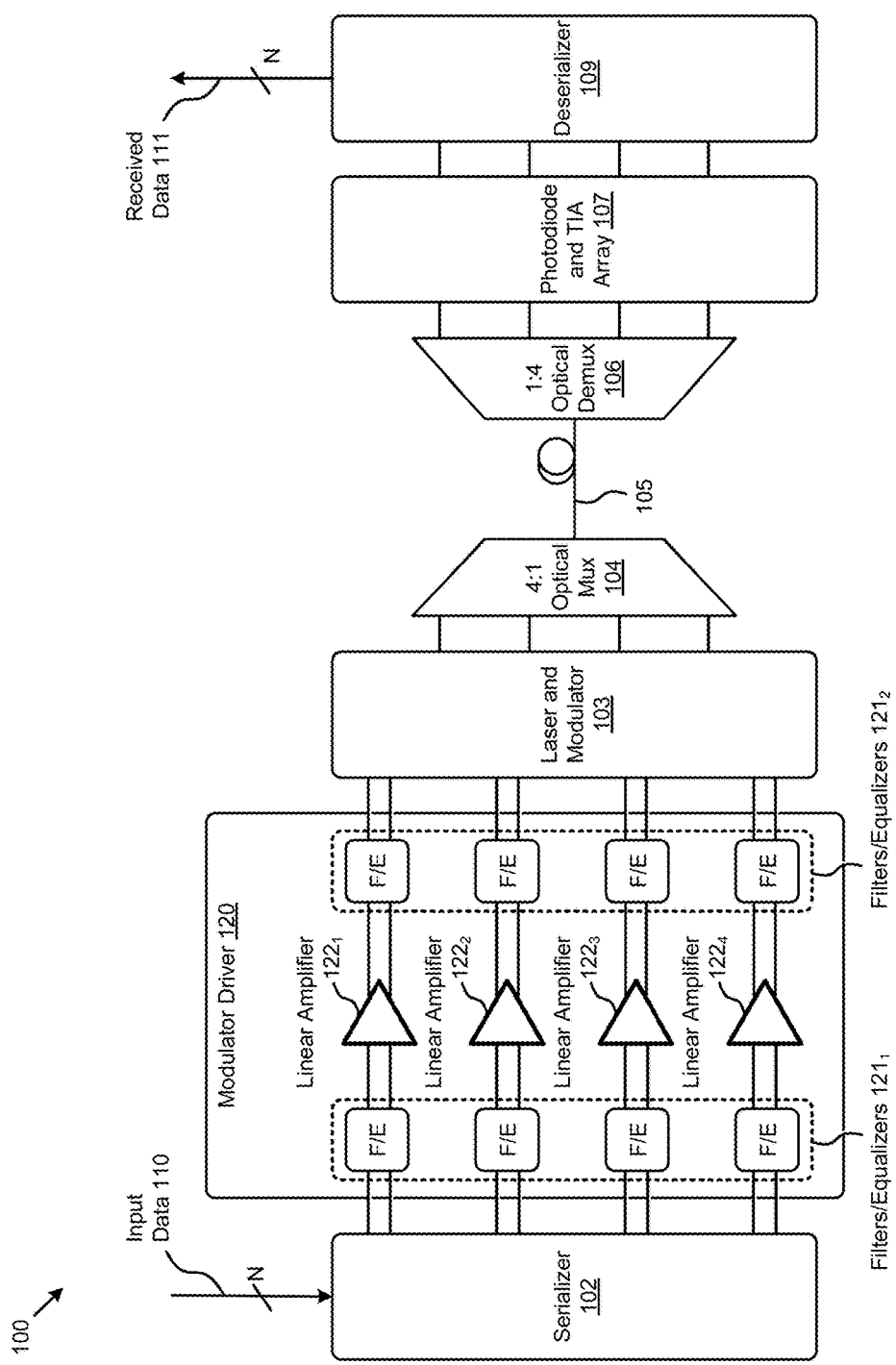
FIG. 1 is an environment that includes non-linear circuits.

Some embodiments of the present disclosure address the problem of efficiently selecting a simulation input signal to accurately predict non-linear characteristics of a circuit as implemented in an electronic system, and some embodiments are directed to approaches for implementing a properties-based tone selection technique to dynamically generate a multitone simulation signal to accurately simulate non-linear circuit characteristics. More particularly, disclosed herein and in the accompanying figures are exemplary environments, methods, and systems for dynamic multitone simulation scenario planning.

OVERVIEW

Disclosed herein are techniques for implementing a properties-based tone selection technique to dynamically generate a multitone simulation signal to accurately simulate non-linear circuit characteristics. In certain embodiments, the tones of the multitone simulation signal can be derived from a subset of possible tones based on certain properties. In some embodiments, the properties might specify that no tone produce a harmonic with a frequency equal to any other tones. Also, the properties might specify that the intermodulation (e.g., second order, third order, etc.) of two tones does not produce a tone with a frequency equal to any other tones. In other embodiments, an amplitude and phase can be determined for the tones in the selected tone set. A multitone transient signal can be generated from the selected tone subset and any associated multitone signal attributes to facilitate a circuit simulation. In some embodiments, characteristics of the multitone transient signal and/or simulation results from the circuit simulation can be analyzed to facilitate dynamically planning simulation scenarios that use multitone simulation signals.

Definitions

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

The term "logic" means any combination of software or hardware that is used to implement all or part of the disclosure.

The term "non-transitory computer readable medium" refers to any medium that participates in providing instructions to a logic processor.

A "module" includes any mix of any portions of computer memory and any extent of circuitry including circuitry embodied as a processor.

Reference is now made in detail to certain embodiments. The disclosed embodiments are not intended to be limiting of the claims.

Descriptions of Exemplary Embodiments

FIG. 1 depicts an environment 100 that includes non-linear circuits. As an option, one or more instances of environment 100 or any aspect thereof may be implemented in the context of the architecture and functionality of the embodiments described herein. Also, the environment 100 or any aspect thereof may be implemented in any desired environment.

As shown in FIG. 1, the environment 100 illustrates an electronic system that can comprise at least one circuit that can be simulated using dynamically generated multitone simulation scenario plans facilitated by the herein disclosed techniques. Specifically, the environment 100 illustrates the high order components of a fiber optic communications system including one or more linear amplifiers that can have non-linear characteristics which might affect the system. For example, the components in environment 100 can represent a 100 GbE LR4 system. The environment 100 might also be representative of other systems in a variety of environments and applications, such as non-optical serial data communication links and memory data interfaces. Specifically, the environment 100 comprises a serializer 102, a modulator driver 120, a laser and modulator 103, a 4:1 optical mux 104, a fiber optic link 105, a 1:4 optical demux 106, a photodiode and TIA array 107, and a deserializer 109. The modulator driver 120 further comprises a plurality of linear amplifiers (e.g., linear amplifier $122_1$, linear amplifier $122_2$, linear amplifier $122_3$, and linear amplifier $122_4$) having filtering and/or equalization components (e.g., filters/equalizers $121_1$ and filters/equalizers $121_2$) at the input stages and outputs stages of the linear amplifiers. As shown in FIG. 1, the linear amplifiers can receive differential input signals from the serializer 102 to produce differential output signals for the laser and modulator 103. The filters and/or equalizers can facilitate amplitude and/or phase compensation of the signals into and/or out of the linear amplifiers. In other systems, any number of linear amplifiers and/or any signaling configuration can be used. The environment 100 further illustrates that parallel (e.g., N wide) instances of input data 110 is received by serializer 102 and converted to a serial data stream having four channels (e.g., for LR4). The electrical signals comprising each channel of serial data are then amplified by a respective linear amplifier for the laser and modulator 103 to be converted to modulated (e.g., PAM-xx, QPSK, etc.) optical signals. The four channels are multiplexed into one channel by 4:1 optical mux 104 and delivered to the fiber optic link 105. The optical signal is received by 1:4 optical demux 106 and demultiplexed to four channels and delivered to photodiode and TIA array 107. The photodiode and TIA array 107 convert the current signals (e.g., through the photodiodes) to voltage signals to be received by deserializer 109. Deserializer 109 then converts the four channels of serial data to parallel (e.g., N wide) received data 111.

The linear amplifiers in systems such as shown in environment 100 are designed to provide an accurate (e.g., high linearity, low distortion) representation of the input data 110 to facilitate, for example, higher orders of multi-level modulation (e.g., PAM-16) implemented at the laser and modulator 103. Designers of such linear amplifiers and other circuits with non-linear characteristics use circuit simulators to evaluate the behavior of their circuits under various conditions (e.g., simulation constraints) so as to predict the performance of the circuit in its intended environment, such as the modulator driver 120 in environment 100. Various approaches to simulating non-linear behavior in circuits is shown and described as pertaining to FIG. 2.

Figure 2:
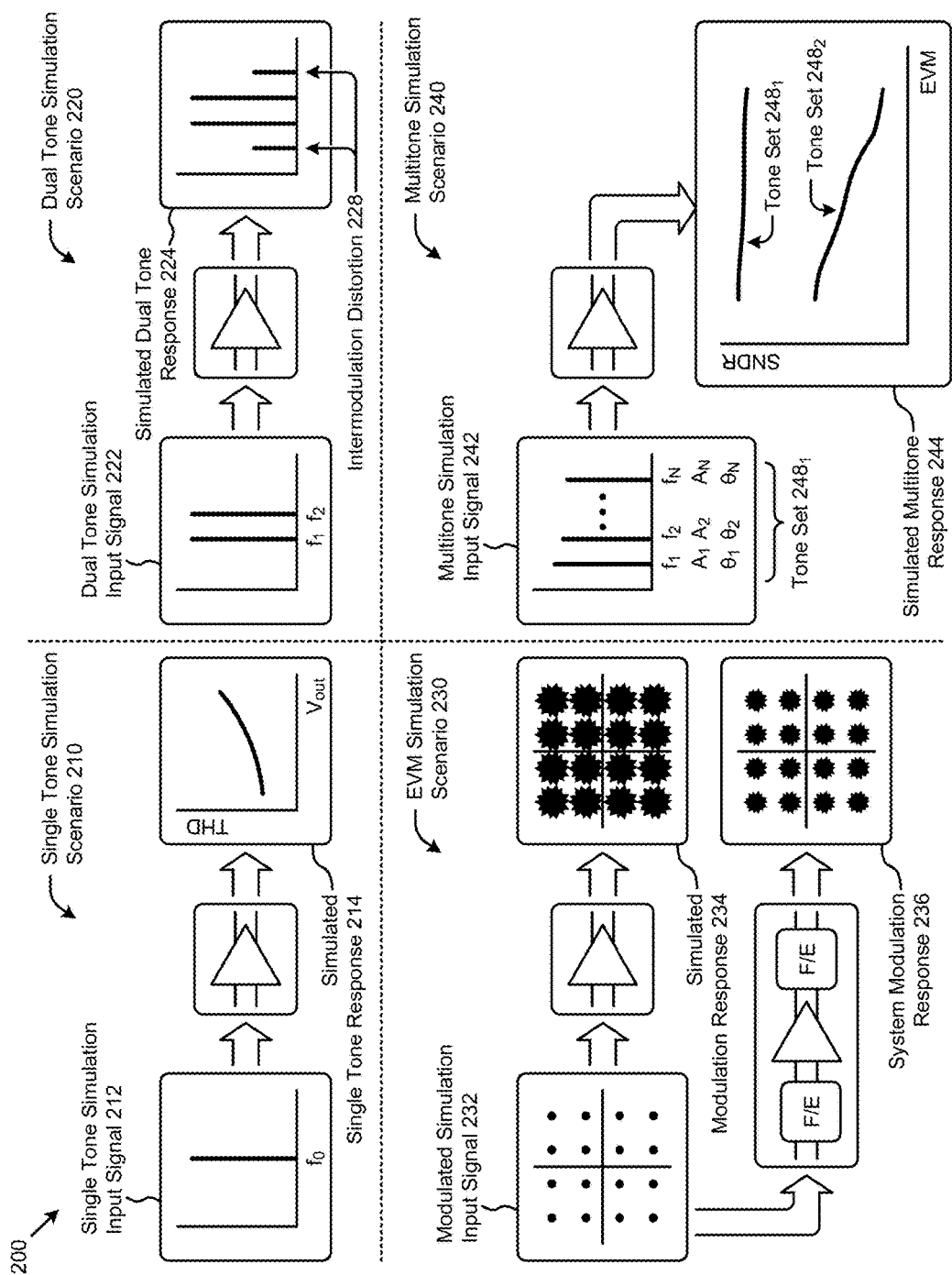
FIG. 2 presents selected simulation techniques as used to facilitate design of non-linear circuits.

FIG. 2 presents selected simulation techniques 200 as used to facilitate design of non-linear circuits. As an option, one or more instances of selected simulation techniques 200 or any aspect thereof may be implemented in the context of the architecture and functionality of the embodiments described herein. Also, the selected simulation techniques 200 or any aspect thereof may be implemented in any desired environment.

One of the selected simulation techniques 200 shown in FIG. 2 pertains to a single tone simulation scenario 210. Specifically, the simulation technique shown in single tone simulation scenario 210 uses a single tone simulation input signal 212 comprising a single periodic wave (e.g., sine wave or cosine wave) or "tone" of a certain frequency (e.g., $f_0$). As shown, a simulated single tone response 214 can predict a total harmonic distortion (THD) over a range of output voltages (e.g., $V_{out}$) produced by the linear amplifier. To generate the THD metric the combined power of the harmonics produced by the single tone is compared to the power of the single tone input signal. While THD can provide an indication of the non-linear behavior of a given circuit, THD might not be correlated to system performance. Further, intermodulation distortion is not included in THD, which intermodulation distortion can be a metric often used to characterize modern electronics systems (e.g., communication systems) that process modulated signals.

The selected simulation techniques 200 further comprises a dual tone simulation scenario 220. Specifically, the simulation technique shown in dual tone simulation scenario 220 uses a dual tone simulation input signal 222 comprising two tones having respective frequencies (e.g., $f_1$ and $f_2$). As shown, a simulated dual tone response 224 can predict various instances of intermodulation distortion 228. For example, intermodulation distortion 228 can comprise distortion corresponding to various second order, third order, and/or other combinations of the dual tones (e.g., $f_2-f_1$, $2f_2-f_1$, $2f_1-f_2$, $f_2+f_1$, $2f_1$, $2f_1$, etc.). By varying (e.g., sweeping) the dual tone frequencies, the frequencies and/or frequency range corresponding to performance maximums and/or minimums can be identified. In some cases, the time to perform a simulation using the dual tone simulation scenario 220 can be long as compared to the time to perform a simulation using the single tone simulation scenario 210. Further, the simulated dual tone response 224 might not be correlated to system performance.

In some cases, an EVM simulation scenario 230 can be used to facilitate a circuit simulation. For example, as shown in a modulated simulation input signal 232, a quadrature amplitude modulation (e.g., 16 QAM) signal can be used for simulation. Such simulations can facilitate non-linear behavior predictions pertaining to intermodulation, harmonics, and group delay. The simulated modulation response 234 might be limited in its correlation to the system modulation response 236 exhibited by the linear amplifier as implemented in the application environment. Such differences might be due at least in part to the filtering and/or equalization (e.g., amplitude and phase compensation) included in the system. Simulating such system components with the circuit can greatly increase the simulation complexity and the EVM simulation time, which EVM simulation time can be long as compared to the earlier described single tone and dual tone simulation scenarios.

Selected simulation techniques 200 also shows a multitone simulation scenario 240. Specifically, the simulation technique shown in multitone simulation scenario 240 uses a multitone simulation input signal 242 comprising a set of multiple tones (e.g., tone set $248_1$) having respective frequencies (e.g., $f_1$, $f_2$, . . . , $f_N$). The multiple tones of the multitone signal can also be characterized by other multitone signal attributes, such as an amplitude (e.g., $A_1$, $A_2$, . . . , $A_N$) or a phase (e.g., $\theta_1$, $\theta_2$, . . . , $\theta_N$) of each of the tones. In such cases, the combined power of the noise and distortion (e.g., harmonics, intermodulation products, etc.) of the circuit in response to the multitone input signal is compared to the power of the multitone input signal to generate a signal-to-noise and distortion ratio (SNDR or SINAD) metric. As shown in a plot of simulated multitone sensitivity 244, the sensitivity of SNDR to EVM can vary according to the sets of tones comprising the multitone simulation input signal. For example, the tone set $248_1$ might correspond to a predicted SNDR that has a low correlation (e.g., curve with slope near zero) to EVM performance. As another example, the tone set $248_2$ might correspond to a predicted SNDR that has a high correlation to EVM performance. In such cases, an instance of the multitone simulation scenario 240 having a multitone simulation input signal comprising the tone set $248_2$ can predict circuit performance with accuracy near the accuracy of an EVM simulation scenario, but without consuming the computing, time, human, and/or other resources of the EVM simulation.

Approaches to implementing such multitone simulation scenarios can be limited at least as pertaining to efficiently selecting a multitone simulation input signal (e.g., selecting the tone set $248_2$) that can accurately predict non-linear characteristics of a circuit (e.g., linear amplifier) as implemented in an electronic system. The herein disclosed techniques for dynamic multitone simulation scenario planning can address the foregoing issues. One aspect of such techniques, selecting the tones for the multitone simulation input signal, is shown and described as pertaining to FIG. 3.

Figure 3:
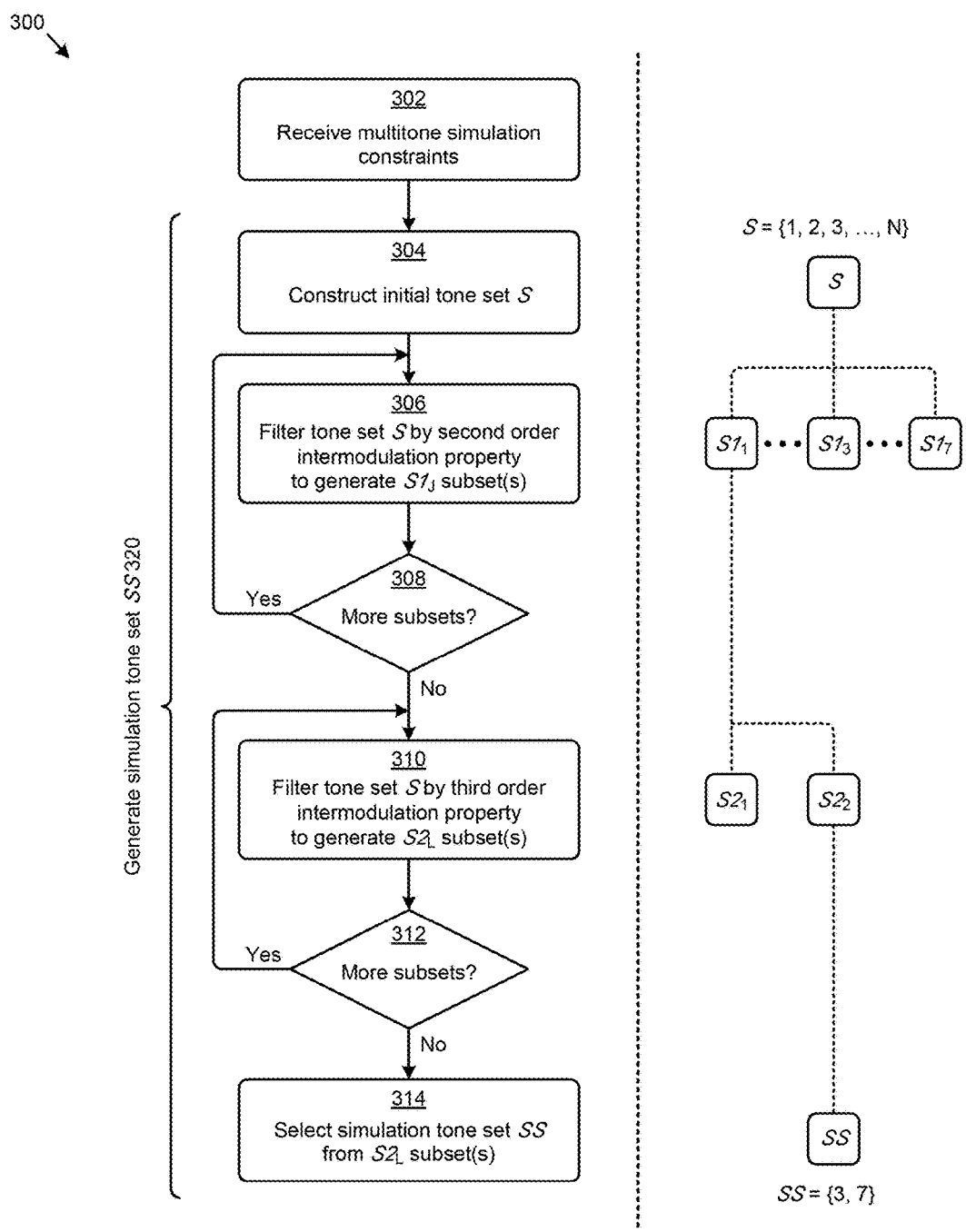
FIG. 3 depicts a tone selection technique as implemented in systems for dynamic multitone simulation scenario planning, according to an embodiment.

FIG. 3 depicts a tone selection technique 300 as implemented in systems for dynamic multitone simulation scenario planning. As an option, one or more instances of tone selection technique 300 or any aspect thereof may be implemented in the context of the architecture and functionality of the embodiments described herein. Also, the tone selection technique 300 or any aspect thereof may be implemented in any desired environment.

The tone selection technique 300 presents one embodiment of certain steps and/or operations for facilitating dynamic multitone simulation scenario planning according to the herein disclosed techniques. In one or more embodiments, the steps and underlying operations comprising tone selection technique 300 can be executed by program instructions stored on a server and/or other computing device in a computing environment. For example, the tone selection technique 300 can be executed by an instance of a multitone simulation scenario planner as later shown and described in FIG. 5 and herein. Specifically, tone selection technique 300 can facilitate efficiently selecting a set of tones, such as a simulation tone set, to comprise a multitone simulation input signal that can be used in a circuit simulation scenario to accurately predict non-linear characteristics of the circuit. In some cases, a tone set or tone subset can be represented by a set the positive integer multiples of a fundamental tone or frequency (e.g., $f_0$) corresponding to each of the tones included in a multitone signal. For example, tone selection technique 300 might select a simulation tone set SS={$k_1$, $k_2$, ..., $k_M$} that can used to generate a multitone simulation signal comprising tones with frequencies F={$k_1 \cdot f_0$, $k_2 \cdot f_0$, ..., $k_M \cdot f_0$}. Certain properties of the selected simulation tone set can enhance the effectiveness of the multitone simulation signal. For example, the simulation tone set might be selected so as to have no tone produce a harmonic with a frequency equal to any other tones. Also, the simulation tone set might be selected such that the intermodulation (e.g., second order, third order, etc.) of two tones does not produce a tone with a frequency equal to any other tones. According to certain embodiments, the properties applied in tone selection technique 300 can be represented as shown in Table 1.

TABLE 1

Simulation Tone Set Selection Properties

| Property Name | Property Definition |
|---|---|
| Second Order Intermodulation Property | For a simulation tone set SS, then for { x, y ∈ SS }: ($m_1 \cdot x + m_2 \cdot y$) ∉ SS where, {$m_1, m_2 \in Z$ } and $|m_1| + |m_2| = 2$ |
| Third Order Intermodulation Property | For a simulation tone set SS, then for { x, y, z ∈ SS }: ($m_1 \cdot x + m_2 \cdot y + m_3 \cdot z$) ∉ SS where, { $m_1, m_2, m_3 \notin Z$ } and $|m_1| + |m_2| + |m_3| = 3$ |

Referring again to FIG. 3, tone selection technique 300 can commence with receiving certain multitone simulation constraints (at step 302). For example, such constraints might pertain to a maximum number of tones, a maximum tone frequency, a maximum peak amplitude, and/or other constraints associated with a multitone simulation scenario. An initial instance of a tone set (e.g., set S) can be constructed (at step 304). In some cases, the tone set S can represent all possible tones. For example, a set S={1, 2, 3, ..., N} might be constructed based on the received multitone simulation constraints (e.g., specifying the value of N). As another example, the set S might comprise only prime number from one to 30. The tone selection technique 300 can further filter the set S to generate one or more tone subsets $S1_J$ of set S according to one or more conditions and/or properties, such as the second order intermodulation property described in Table 1 (at step 306). According to some embodiments, pseudo-code for filtering the set S according to the second order intermodulation property can be represented as shown in Table 2.

TABLE 2

Second Order Intermodulation Property Filtering Pseudo-Code

| Ref | Pseudo-Code |
|---|---|
| 1 | initialize S = {1, 2, 3, ..., N} |
| 2 | for all integers $m_1, m_2$ such that $|m_1| + |m_2| = 2$ |
| 3 |   for x ∈ S |
| 4 |     for y ∈ S |

TABLE 2-continued

Second Order Intermodulation Property Filtering Pseudo-Code

| Ref | Pseudo-Code |
|---|---|
| 5 |       u = $m_1 \cdot x + m_2 \cdot y$ |
| 6 |       if u ∈ S |
| 7 |         delete x, y, or u from S |
| 8 |       end |
| 9 |     end |
| 10 |   end |
| 11 | end |
| 12 | assign $S1_J$ = S |

As illustrated in FIG. 3, filtering the set S according to the second order intermodulation property and/or other properties can result in multiple subsets (e.g., $S1_1$, ..., $S1_3$, ..., $S1_7$). This is due at least in part to a flexibility in choosing the set element to delete when applying the property. Specifically, for example, line 7 in Table 2 indicates that "x, y, or u" can be deleted from the set S when the property criteria are not satisfied. Table 3 and Table 4 illustrate examples of how the second order intermodulation property can be used to generate multiple subsets based at least in part on the choice of elements to delete.

TABLE 3

Second Order Property Filtering Example A

| $m_1$ | $m_2$ | x | y | u = $m_1 x + m_2 y$ | Remove "x" from set |
|---|---|---|---|---|---|
| | | Initial set S: | | | { 1, 2, 3, 4, 5, 6, 7, 8 } |
| 1 | 1 | 1 | 1 | 2 | { 2, 3, 4, 5, 6, 7, 8 } |
| 1 | 1 | 2 | 2 | 4 | { 3, 4, 5, 6, 7, 8 } |
| 1 | 1 | 3 | 3 | 6 | { 4, 5, 6, 7, 8 } |
| 1 | 1 | 4 | 4 | 8 | { 5, 6, 7, 8 } = $S1_A$ |

TABLE 4

Second Order Property Filtering Example B

| $m_1$ | $m_2$ | x | y | u = $m_1 x + m_2 y$ | Remove "u" from set |
|---|---|---|---|---|---|
| | | Initial set S: | | | { 1, 2, 3, 4, 5, 6, 7, 8 } |
| 1 | 1 | 1 | 1 | 2 | { 1, 3, 4, 5, 6, 7, 8 } |
| 1 | 1 | 3 | 3 | 6 | { 1, 3, 4, 5, 7, 8 } |
| 1 | 1 | 4 | 4 | 8 | { 1, 3, 4, 5, 7 } |
| 1 | 1 | 1 | 3 | 4 | { 1, 3, 5, 7 } = $S1_B$ |

As depicted in the foregoing examples, two different sets (e.g., $S1_A$={5, 6, 7, 8} and $S1_B$={1, 3, 5, 7}) satisfying the second order intermodulation property are obtained based at least in part upon which element (e.g., from x, y, and u) is deleted. In some cases, more subsets can be generated by applying the second order intermodulation property to the set S (see "Yes" path of decision 308). When the desired subsets (e.g., all possible) are generated (see "No" path of decision 308), the tone set S can be filtered by the third order intermodulation property to generate one or more tone subsets $S2_L$ (at step 310). In some cases, the filtering can be applied to the tone subsets $S1_J$ to generate the subsets $S2_L$, as illustrated in FIG. 3. Any of the property filters can be applied in any order. According to some embodiments, pseudo-code for filtering the set S according to the third order intermodulation property can be represented as shown in Table 5.

TABLE 5

Third Order Intermodulation Property Filtering Pseudo-Code

| Ref | Pseudo-Code |
|---|---|
| 1 | initialize S = {1, 2, 3, . . . , N} |
| 2 | for all integers $m_1$, $m_2$, $m_3$ such that $|m_1| + |m_2| + |m_3| = 3$ |
| 3 |   for x ∈ S |
| 4 |     for y ∈ S |
| 5 |       for z ∈ S |
| 6 |         u = $m_1$ • x + $m_2$• y + $m_3$• z |
| 7 |         if u ∈ S |
| 8 |           delete x, y, z, or u from S |
| 9 |         end |
| 10 |       end |
| 11 |     end |
| 12 |   end |
| 13 | end |
| 14 | assign $S2_L$ = S |

As illustrated in FIG. 3, filtering the set S and/or the subsets $S1_J$ according to the third order intermodulation property and/or other properties (e.g., an Nth order intermodulation property) can result in multiple instances of the tone subsets $S2_L$ (e.g., $S2_1$ and $S2_2$). This is due at least in part to a flexibility in choosing the set element to delete when applying the property. Specifically, for example, line 8 in Table 5 indicates that "x, y, z, or u" can be deleted from the set S when the property criteria are not satisfied. In some cases, more subsets $S2_L$ can be generated by applying the third order intermodulation property to the set S (see "Yes" path of decision 312). When the desired subsets (e.g., all possible) are generated (see "No" path of decision 312), a simulation tone set (e.g., set SS) can be selected from the filtered subsets (e.g., $S1_J$ and/or $S2_L$) (at step 314). The selection of the simulation tone set SS can be based on various factors. For example, set SS might be selected to have a maximum number of elements (e.g., tones) with a more uniform separation (e.g., spread across a frequency spectrum). For example, filtering the results $S1_A$ and $S1_B$ in the foregoing examples according to the third order intermodulation property might result in the subsets $S2_A$={7, 8} and $S2_B$={3, 7}. In this case, set $S2_B$ might be selected as the simulation tone set SS since it comprises elements exhibiting a more even distribution as compared to the elements of subset $S2_A$.

As shown, a certain portion of the steps comprising the tone selection technique 300 can be performed to comprise an operation for generating a simulation tone set SS (see operation 320) to facilitate the herein disclosed techniques for dynamic multitone simulation scenario planning. One embodiment of a technique using operation 320 is shown and described as pertaining to FIG. 4.

Figure 4:
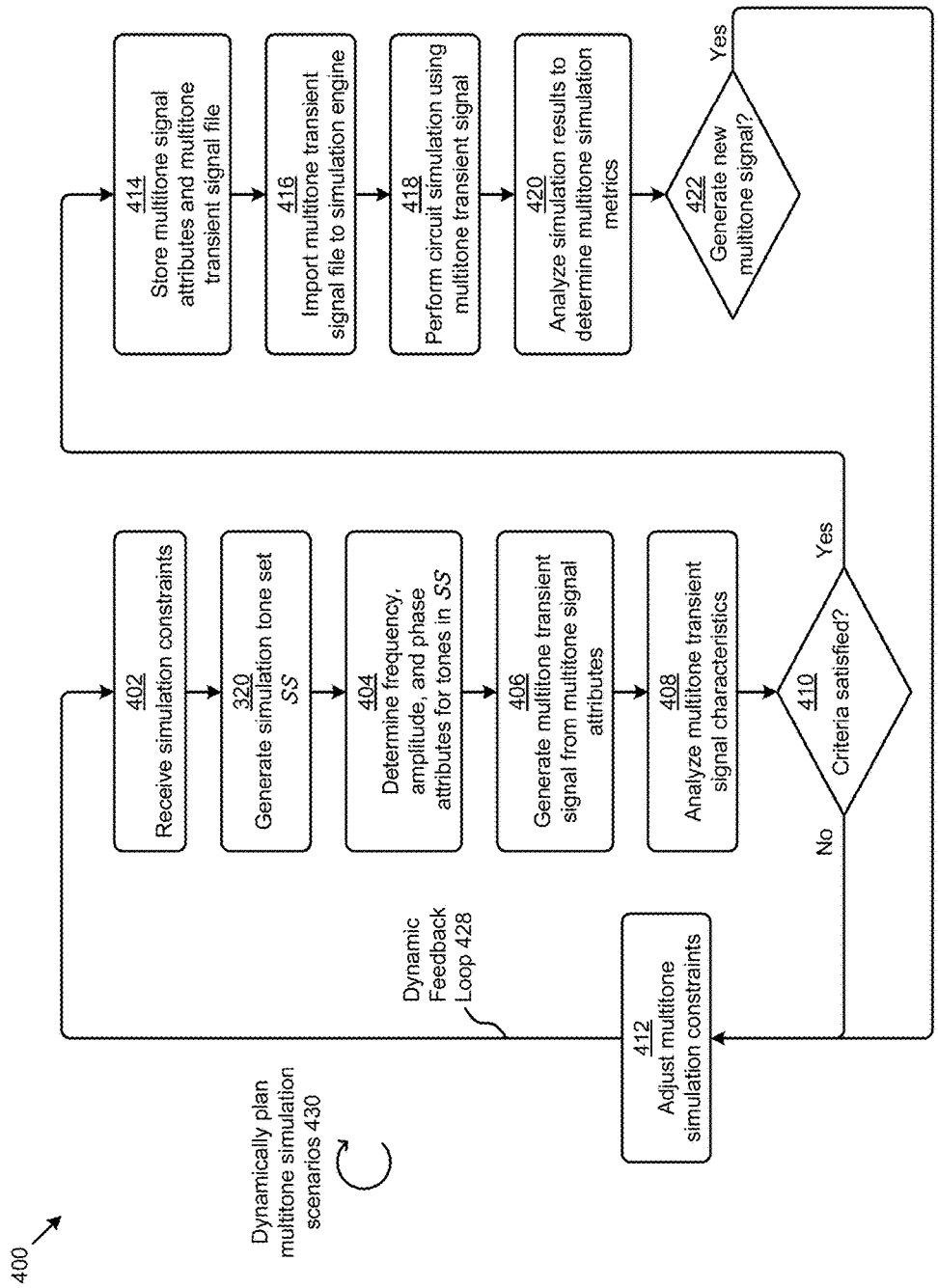
FIG. 4 depicts a dynamic multitone simulation signal generation technique facilitated by systems for dynamic multitone simulation scenario planning, according to an embodiment.

FIG. 4 depicts a dynamic multitone simulation signal generation technique 400 facilitated by systems for dynamic multitone simulation scenario planning. As an option, one or more instances of dynamic multitone simulation signal generation technique 400 or any aspect thereof may be implemented in the context of the architecture and functionality of the embodiments described herein. Also, the dynamic multitone simulation signal generation technique 400 or any aspect thereof may be implemented in any desired environment.

The dynamic multitone simulation signal generation technique 400 presents one embodiment of certain steps and/or operations for facilitating dynamic multitone simulation scenario planning according to the herein disclosed techniques. In one or more embodiments, the steps and underlying operations comprising dynamic multitone simulation signal generation technique 400 can be executed by program instructions stored on a server and/or other computing device in a computing environment. For example, the dynamic multitone simulation signal generation technique 400 can be executed by an instance of a multitone simulation scenario planner and/or other components in a circuit simulation environment as later shown and described in FIG. 5 and herein. Specifically, dynamic multitone simulation signal generation technique 400 can facilitate dynamically generating a multitone simulation signal that can be used in a circuit simulation scenario to accurately predict non-linear characteristics of the circuit. Dynamic multitone simulation signal generation technique 400 can commence with receiving certain multitone simulation constraints (at step 402). For example, such constraints might pertain to a maximum number of tones, a maximum tone frequency, a maximum peak amplitude, and/or other constraints associated with a multitone simulation scenario. A simulation tone set (e.g., set SS) can be generated as earlier shown and described as pertaining to FIG. 3 (at operation 320). For example, a simulation tone set SS={$k_1$, $k_2$, . . . , $k_M$} might be generated according to the techniques described in FIG. 3 and herein.

Attributes describing the frequency, amplitude, and phase of the tones corresponding to the simulation tone set SS can be determined (at step 404). For example, the foregoing instance of simulation tone set SS={$k_1$, $k_2$, . . . , $k_M$} can define the set of frequencies F of a multitone simulation signal having a fundamental tone $f_0$ as F={$k_1 \cdot f_0$, $k_2 \cdot f_0$, . . . , $k_M \cdot f_0$}. Further, the amplitude and phase of each tone can be determined based at least in part on certain criteria, such as the peak-to-average ratio of the multitone signal, various first order statistics (e.g., tone amplitude histogram) of the multitone signal, and/or other criteria. For example, if the simulated circuit is designed to transmit a particular signal (e.g., QAM, OFDM, etc.) at a given baud rate in an electronics system, minimizing the mean squared error (MSE) between the multitone signal the transmitted signal can be one objective. Various techniques can be used to determine the amplitude and/or phase of the multitone signal so as to minimize the MSE. For example, techniques used to determine the coefficients of a Fourier series can be applied to determining the amplitude and/or the phase of the tones comprising a multitone signal. In some cases, the number of tones can affect the MSE between the multitone signal and the transmitted signal. As another example, combinations of tones having the same amplitude and randomly generated phases can be analyzed to select a combination that exhibits a peak-to-average ratio nearest a certain specified value.

The frequency, amplitude, and phase attributes determined for the tones in the simulation tone set SS can be used generate a transient signal for circuit simulation (at step 406). Certain characteristics and/or metrics associated with the multitone transient signal can then be analyzed (at step 408). If the transient signal does not satisfy certain criteria (see "No" path of decision 410), then various multitone simulation constraints might need to be adjusted (at step 412) and at least some of the foregoing steps might need to be repeated. For example, the number of elements in the tone set might need to be increased to decrease the MSE of the multitone signal such that a maximum MSE threshold can be satisfied. When all criteria pertaining to the generated multitone transient signal are satisfied (see "Yes" path of decision 410), the multitone signal attributes and a multitone transient signal file describing the multitone transient signal can be stored (at step 414). In some embodiments, the multitone transient signal file can be imported to a simulation engine (at step 416) to perform a circuit simulation (at step 418). The results from the circuit simulation can be analyzed to determine various multitone simulation metrics (at step 420). In some cases, the multitone simulation metrics might invoke the generation of a new multitone signal (see "Yes" path of decision 422). One or more adjustments to the multitone simulation constraints might be precipitated by the simulation result analyses (at step 412). For example, the simulation might be one of many simulations to determine a sensitivity of the circuit to one or more parameters. In such cases, the simulation results can indicate adjustments that might be made to the multitone signal and/or other simulation constraints.

As illustrated in FIG. 4, a dynamic feedback loop 428 that might be traversed responsive to the analysis of the simulation results and/or the multitone transient signal characteristics (e.g., at step 420 and step 408, respectively) can facilitate dynamic multitone simulation scenario planning (see operation 430). Specifically, such analyses can trigger automatic and/or manual changes to certain multitone simulation constraints to generate multitone simulation signals for various multitone simulation scenarios. One embodiment of an environment for facilitating such dynamic multitone simulation scenario planning according to the herein disclosed techniques is shown and described as pertaining to FIG. 5.

Figure 5:
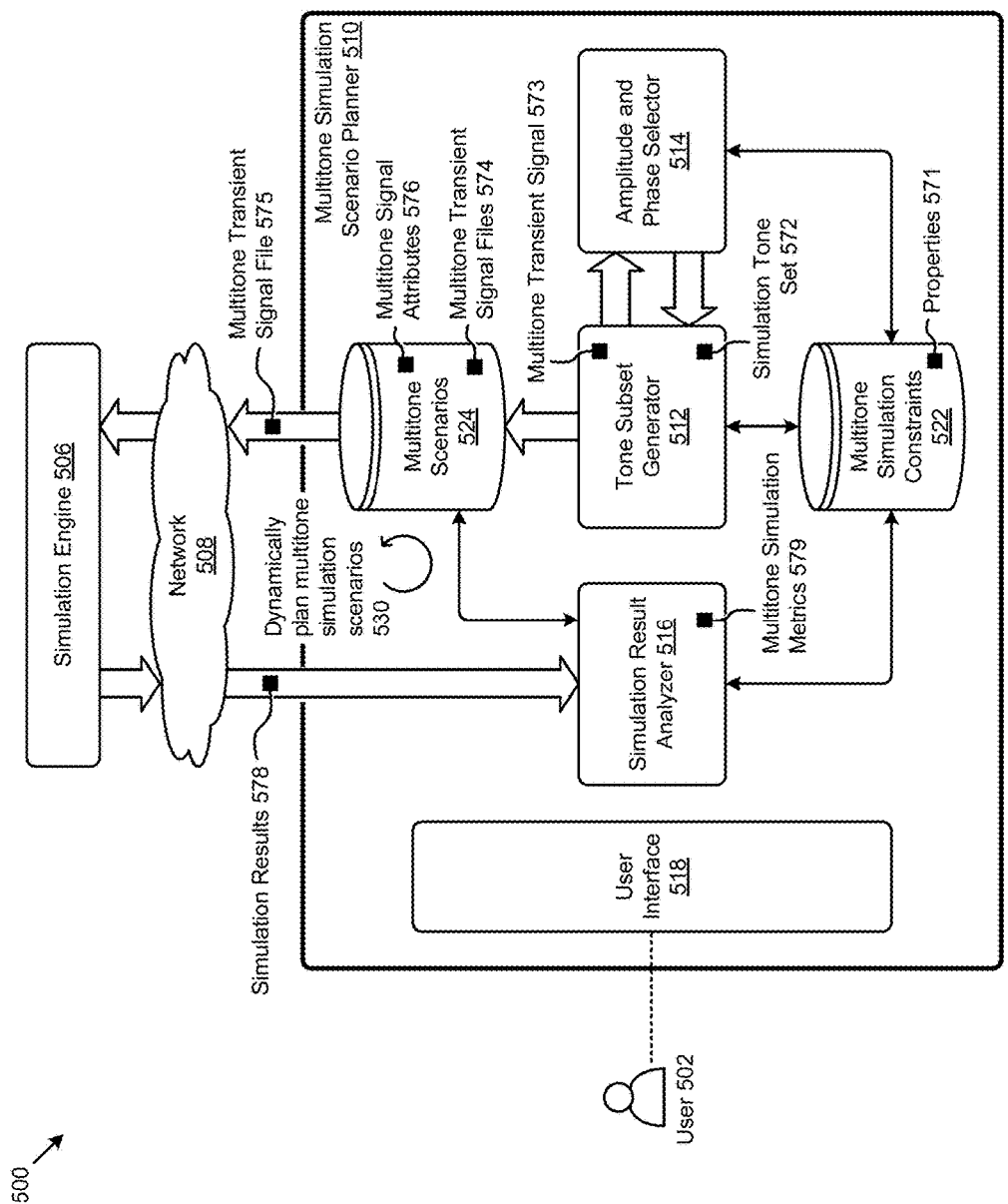
FIG. 5 illustrates a circuit simulation environment showing an implementation of a subsystem for dynamic multitone simulation scenario planning, according to an embodiment.

FIG. 5 illustrates a circuit simulation environment 500 showing an implementation of a subsystem for dynamic multitone simulation scenario planning. As an option, one or more instances of circuit simulation environment 500 or any aspect thereof may be implemented in the context of the architecture and functionality of the embodiments described herein. Also, the circuit simulation environment 500 or any aspect thereof may be implemented in any desired environment.

Shown in FIG. 5 is a multitone simulation scenario planner 510 implemented in a circuit simulation environment 500 to facilitate the herein disclosed techniques. In certain embodiments, multitone simulation scenario planner 510 can be implemented in a server and/or other computing device. Multitone simulation scenario planner 510 can interact with a simulation engine 506 through a network 508 to perform various circuit simulations using the multitone signals generated by multitone simulation scenario planner 510. The network 508 can comprise any combination of a wide area network (e.g., WAN), local area network (e.g., LAN), cellular network, wireless LAN (e.g., WLAN), or any such means for enabling communication of computing systems. The network 508 can also be referred to as the Internet. A user 502 can also interact with multitone simulation scenario planner 510 through a user interface 518. In some embodiments, multitone simulation scenario planner 510 can comprise a tone subset generator 512, an amplitude and phase selector 514, a simulation result analyzer 516, and various storage facilities to store data pertaining to multitone simulation constraints 522 and multitone scenarios 524. The system components of FIG. 5 present merely one partitioning. The specific example shown is purely exemplary, and other partitioning is reasonable.

The foregoing components comprising circuit simulation environment 500 can interact to facilitate dynamic multitone simulation scenario planning. Specifically, tone subset generator 512 can select a simulation tone set 572 based at least in part on a set of properties 571 comprising the multitone simulation constraints 522. For example, the properties 571 might comprise the second order intermodulation property and the third order intermodulation property earlier described. The amplitude and phase selector 514 can determine the amplitude and phase for each of the tones in the simulation tone set 572. In some cases, amplitude and phase selector 514 might also use the multitone simulation constraints 522 to determine the amplitude and phase. For example, a maximum threshold for mean squared error of the multitone signal as compared to the system transmitted signal might be included in the multitone simulation constraints 522. A multitone transient signal 573 can be generated from the simulation tone set 572. The multitone transient signal can be codified in a file for storage in a set of multitone transient signal files 574 in multitone scenarios 524. Various instances of multitone signal attributes 576 (e.g., tone frequency, amplitude, phase, etc.) can also comprise multitone scenarios 524.

A selected file from the multitone transient signal files 574 (e.g., multitone transient file 575) can be delivered to the simulation engine 506 to facilitate a circuit simulation. In some cases, a set of simulation results 578 can be received from the simulation engine 506 by the simulation result analyzer 516 at the multitone simulation scenario planner 510. The simulation results can be used by simulation result analyzer 516 to calculate various metrics (e.g., multitone simulation metrics 579) associated with the multitone simulation. In certain embodiments, characteristics of the multitone transient signal 573 and/or the multitone simulation metrics 579 can facilitate dynamically planning multitone simulation scenarios (see operation 530) by, for example, automatically generating multitone simulation signals responsive to receiving such information.

In other cases, the generation of some multitone simulation signals comprising the scenarios can be responsive at least in part to the interactions of user 502 with user interface 518. One embodiment of such an interface is shown and described as pertaining to FIG. 6.

Figure 6:
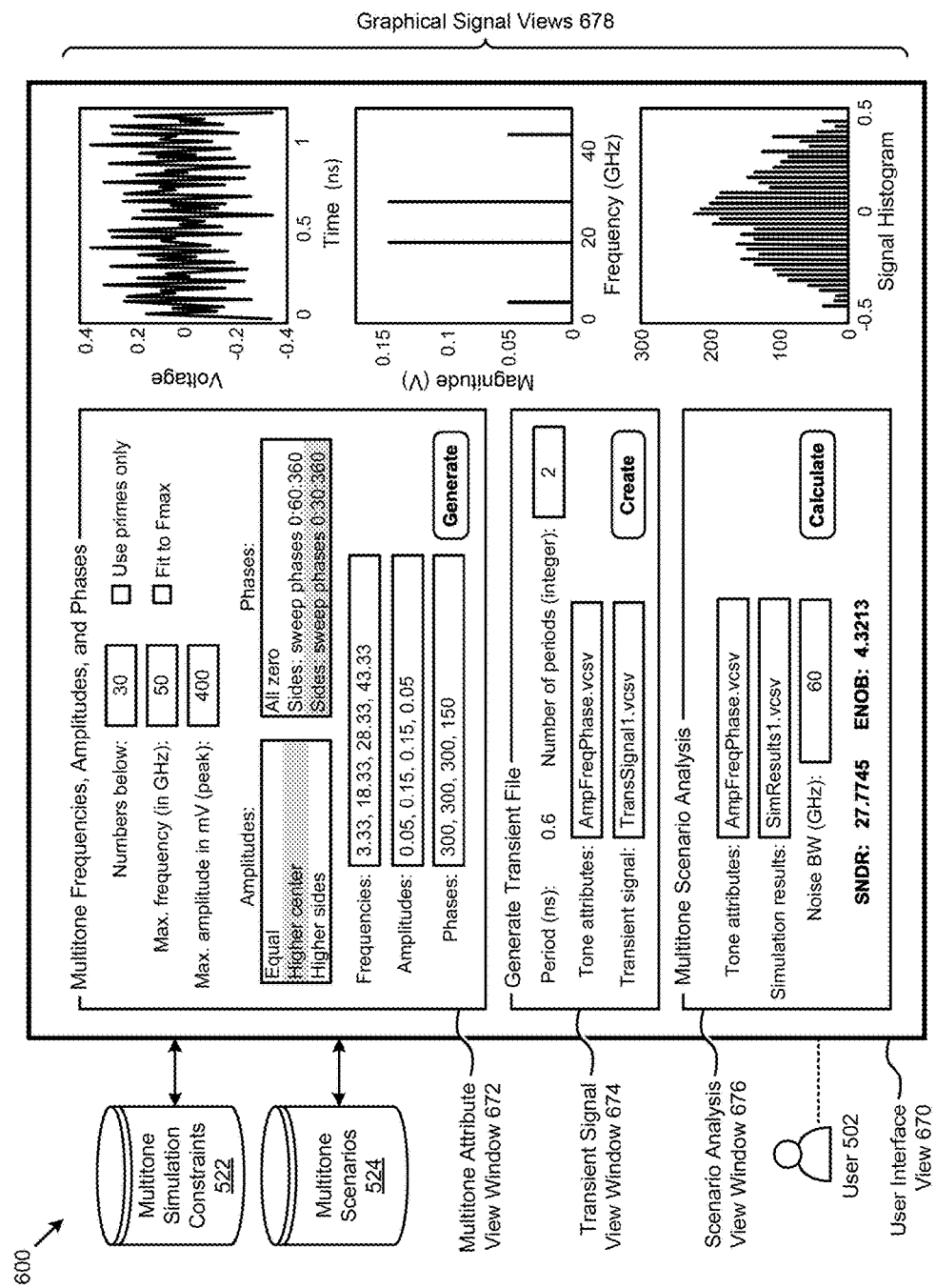
FIG. 6 depicts a user interaction environment for interfacing with systems that facilitate dynamic multitone simulation scenario planning, according to an embodiment.

FIG. 6 depicts a user interaction environment 600 for interfacing with systems that facilitate dynamic multitone simulation scenario planning. As an option, one or more instances of user interaction environment 600 or any aspect thereof may be implemented in the context of the architecture and functionality of the embodiments described herein. Also, the user interaction environment 600 or any aspect thereof may be implemented in any desired environment.

Specifically, the user interaction environment 600 can be used by user 502 to establish certain instances of multitone scenarios 524 comprising various multitone simulation signals generated using the herein disclosed techniques. The user interaction environment 600 might further access the multitone simulation constraints 522 for various purposes (e.g., dropdown selection population, specified parameter storage, etc.). More specifically, as shown, the user interaction environment 600 might comprise a user interface view 670 including a multitone attribute view window 672, a transient signal view window 674, a scenario analysis view window 676, and a set of graphical signal views 678. For example, the user interface view 670 might be presented to user 502 in a browser application or installed application operating on one or more computing devices connected by a network to a simulation environment.

As shown, the multitone attribute view window 672 can present various input entry elements (e.g., dropdown selections, text boxes, etc.) through which user 502 can view and/or specify certain attributes pertaining to a multitone simulation signal. For example, user 502 might specify the size of the initial tone set (e.g., see "Number below" entry), the maximum peak amplitude of the multitone signal (e.g., see "Max. amplitude in mV (peak)" entry), and/or other attributes. When all settings are selected by user 502 and/or accessed from the multitone simulation constraints 522, the "Generate" button can be clicked to generate the simulation tone set and associated multitone signal attributes. For example, the "Frequencies", "Amplitudes", and "Phases" of the tone comprising an example multitone signal is shown in the multitone attribute view window 672.

The transient signal view window 674 can be used by user 502 to generate the multitone transient signal from the simulation tone set and associated multitone signal attributes. Specifically, the simulation tone set and associated multitone signal attributes can be represented in a "Tone attributes" file (e.g., file "AmpFreqPhase.vcsv") that is used to generate a multitone transient signal file (e.g., see "Transient Signal" file "TransSignal1.vcsv") by clicking the "Create" button. The user 502 can also specify the "Number of periods" for the multitone transient file. For example, the number of periods might be selected and/or calculated such that an integer number of cycles for each tone are contained in the generated multitone signal. In such cases, a fast Fourier transform (FFT) of the multitone signal can be computed (e.g., in analyzing the multitone signal and/or simulation results) with no spectral spread or leakage. Such calculations pertaining to various characteristics (e.g., voltage in the time domain, tone magnitude in the frequency domain, signal amplitude statistics, etc.) of the multitone transient signal can be displayed as shown in the graphical signal views 678.

The scenario analysis view window 676 can be used by user 502 to further analyze the multitone simulation signal and/or other attributes of the multitone simulation scenario. Specifically, the multitone simulation signal (e.g., described by "Tone attributes" file "AmpFreqPhase.vcsv") can be analyzed with various simulation results (e.g., described by "Simulation results" file "SimResults1.vcsv"). For example, a "Noise BW" might be specified to facilitate calculation of SNDR and effective number of bits (ENOB) from the simulation results. Other calculations are possible.

ADDITIONAL EMBODIMENTS OF THE DISCLOSURE

Figure 7:
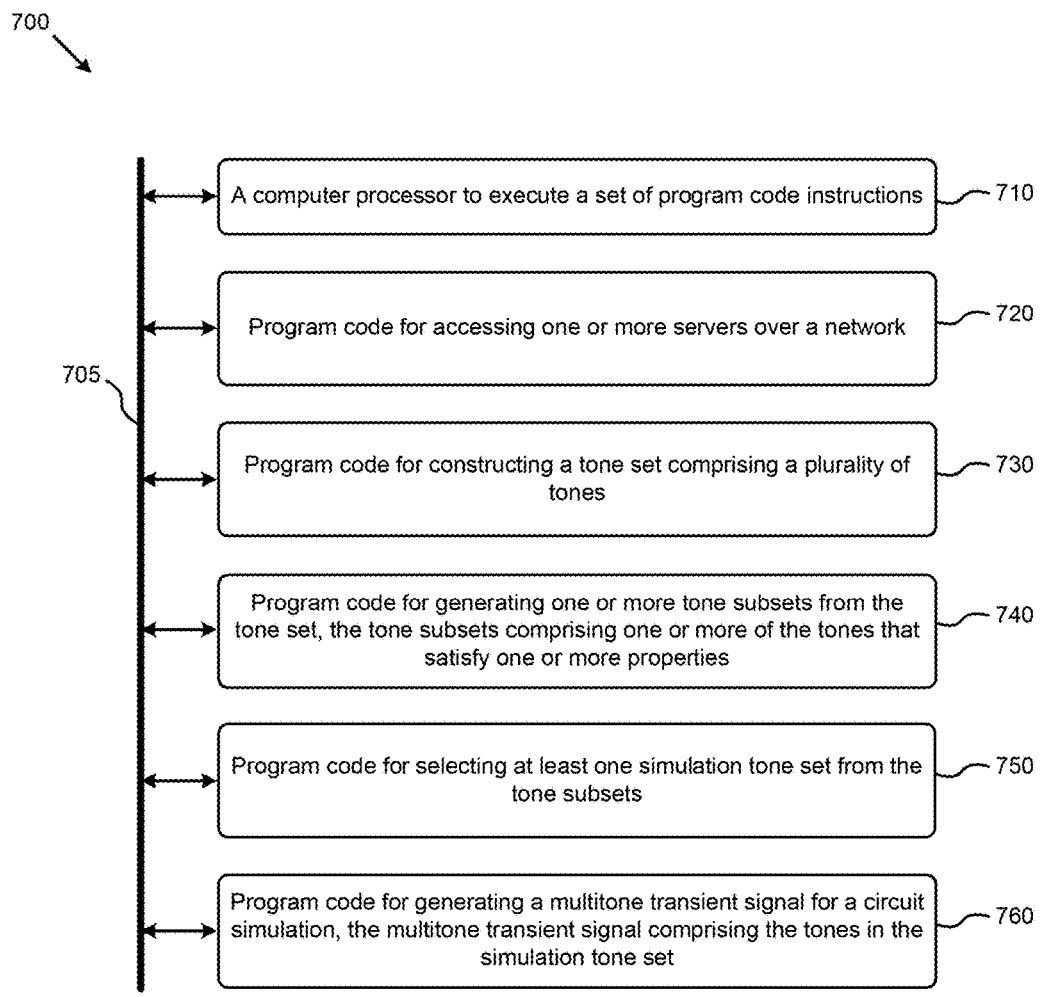
FIG. 7 depicts a system as an arrangement of computing modules that are interconnected so as to operate cooperatively to implement certain of the herein-disclosed embodiments.

FIG. 7 depicts a system 700 as an arrangement of computing modules that are interconnected so as to operate cooperatively to implement certain of the herein-disclosed embodiments. The partitioning of system 700 is merely illustrative and other partitions are possible.

Variations of the foregoing may include more or fewer of the shown modules and variations may perform more or fewer (or different) steps, and/or may use data elements in more, or fewer, or different operations. As an option, the system 700 may be implemented in the context of the architecture and functionality of the embodiments described herein. Of course, however, the system 700 or any operation therein may be carried out in any desired environment. The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The shown embodiment implements a portion of a computer system, presented as system 700, comprising a computer processor to execute a set of program code instructions (see module 710) and modules for accessing memory to hold program code instructions to perform: accessing one or more servers over a network (see module 720); constructing a tone set comprising a plurality of tones (see module 730); generating one or more tone subsets from the tone set, the tone subsets comprising one or more of the tones that satisfy one or more properties (see module 740); selecting at least one simulation tone set from the tone subsets (see module 750); and generating a multitone transient signal for a circuit simulation, the multitone transient signal comprising the tones in the simulation tone set (see module 760).

ADDITIONAL EXAMPLES

Figure 8:
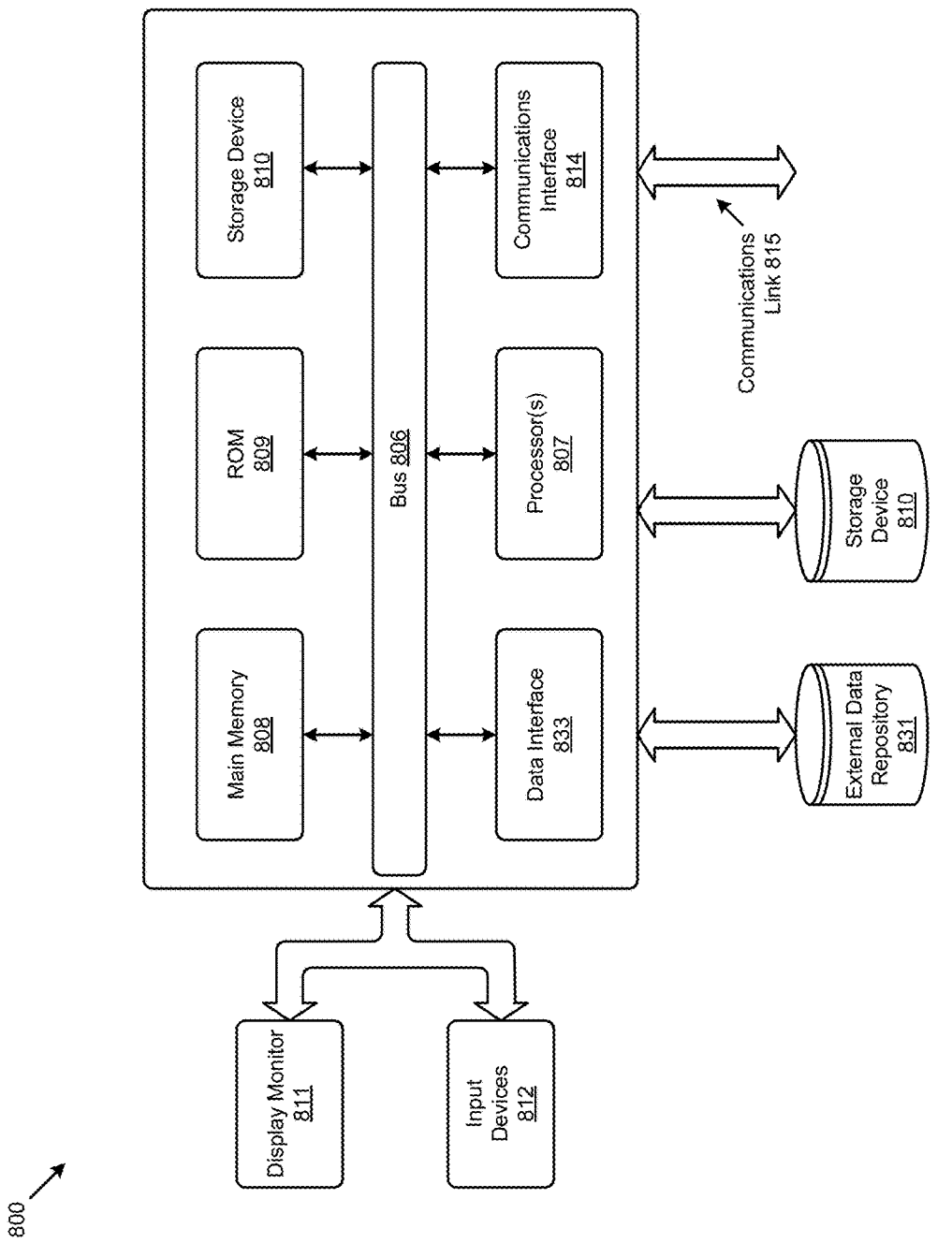
FIG. 8 depicts a block diagram of an instance of a computer system suitable for implementing embodiments of the present disclosure.

It should be noted that there are alternative ways of implementing the embodiments disclosed herein. Accordingly, the embodiments and examples presented herein are to be considered as illustrative and not restrictive, and the claims are not to be limited to the details given herein, but may be modified within the scope and equivalents thereof.
Additional System Architecture Examples FIG. 8 depicts a block diagram of an instance of a computer system 800 suitable for implementing embodiments of the present disclosure. Computer system 800 includes a bus 806 or other communication mechanism for communicating information, which interconnects subsystems and devices such as a processor 807, a system memory (e.g., main memory 808, or an area of random access memory (RAM)), a static storage device (e.g., ROM 809), a storage device 810 (e.g., magnetic or optical), a data interface 833, a communication interface 814 (e.g., modem or Ethernet card), a display monitor 811 (e.g., CRT or LCD), input devices 812 (e.g., keyboard, cursor control, etc.), and an external data repository 831.

According to one embodiment of the disclosure, computer system 800 performs specific operations by processor 807 executing one or more sequences of one or more instructions contained in system memory. Such instructions may be read into system memory from another computer readable/usable medium such as a static storage device or a disk drive. In alternative embodiments, hard-wired circuitry may be used in place of, or in combination with, software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 807 for execution. Such a medium may take many forms including, but not limited to, non-volatile media and volatile media. Non-volatile media includes, for example, optical or magnetic disks such as disk drives or tape drives. Volatile media includes dynamic memory such as a RAM memory.

Common forms of computer readable media include, for example, floppy disks, flexible disks, hard disks, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge; or any other non-transitory medium from which a computer can read data.

In an embodiment of the disclosure, execution of the sequences of instructions to practice the disclosure is performed by a single instance of the computer system 800. According to certain embodiments of the disclosure, two or more instances of computer system 800 coupled by a communications link 815 (e.g., LAN, PTSN, or wireless network) may perform the sequence of instructions required to practice the disclosure in coordination with one another.

Computer system 800 may transmit and receive messages, data and instructions, including programs (e.g., application code), through communications link 815 and communication interface 814. Received program code may be executed by processor 807 as it is received and/or stored in storage device 810 or any other non-volatile storage for later execution. Computer system 800 may communicate through a data interface 833 to a database on the external data repository 831. Data items in the database can be accessed using a primary key (e.g., a relational database primary key). A module as used herein can be implemented using any mix of any portions of the system memory and any extent of hard-wired circuitry including hard-wired circuitry embodied as a processor 807.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than in a restrictive sense.

What is claimed is:

1. A method for simulating a non-linear circuit comprising:
   accessing one or more servers over a network, the servers to perform one or more operations comprising:
   constructing a tone set comprising a plurality of tones by filtering according to at least an intermodulation property;
   generating one or more tone subsets from the tone set, the tone subsets comprising one or more of the tones that satisfy one or more properties;
   selecting at least one simulation tone set from the tone subsets based at least on a predetermined characteristic of the non-linear circuit; and
   generating a multitone transient signal to facilitate a circuit simulation, the multitone transient signal comprising the tones in the simulation tone set.

2. The method of claim 1, further comprising determining at least one of, an amplitude, or a phase, of at least one of the tones in the simulation tone set.

3. The method of claim 2, wherein the amplitude or the phase is based at least in part on the simulation tone set.

4. The method of claim 2, wherein a second simulation tone set is selected based at least in part on one or more multitone transient signal characteristics describing the multitone transient signal.

5. The method of claim 1, further comprising analyzing one or more simulation results produced by the circuit simulation to determine one or more multitone simulation metrics.

6. The method of claim 5, wherein a second simulation tone set is selected based at least in part on the multitone simulation metrics.

7. The method of claim 1, further comprising calculating one or more multitone signal characteristics of the multitone transient signal.

8. The method of claim 1, further comprising storing at least one multitone simulation scenario comprising at least one of, at least one multitone transient signal file describing the multitone transient signal, or one or more multitone signal attributes describing the tones in the simulation tone set.

9. The method of claim 8, wherein the multitone signal attributes characterize at least one of, a frequency, an amplitude, or a phase, of at least one of the tones in the simulation tone set.

10. The method of claim 1, wherein the properties comprise at least one of, a second order intermodulation property, a third order intermodulation property, or an Nth order intermodulation property.

11. The method of claim 1, wherein at least one of the operations is based at least in part on one or more multitone simulation constraints.

12. A non-transitory computer readable medium, the non-transitory computer readable medium having stored thereon a sequence of instructions for simulating a non-linear circuit which, when stored in memory and executed by a processor causes the processor to perform a set of acts, the acts comprising:
    constructing a tone set comprising a plurality of tones;
    generating one or more tone subsets from the tone set by filtering according to at least an intermodulation property, the tone subsets comprising one or more of the tones that satisfy one or more properties;
    selecting at least one simulation tone set from the tone subsets based at least on a predetermined characteristic of the non-linear circuit; and
    generating a multitone transient signal to facilitate a circuit simulation, the multitone transient signal comprising the tones in the simulation tone set.

13. The non-transitory computer readable medium of claim 12, wherein the acts further comprise determining at least one of, an amplitude, or a phase, of at least one of the tones in the simulation tone set.

14. The non-transitory computer readable medium of claim 13, wherein a second simulation tone set is selected based at least in part on one or more multitone transient signal characteristics describing the multitone transient signal.

15. The non-transitory computer readable medium of claim 12, wherein a second simulation tone set is selected based at least in part on one or more multitone simulation metrics, the multitone simulation metrics derived from one or more simulation results produced by the circuit simulation.

16. The non-transitory computer readable medium of claim 12, wherein the acts further comprise storing at least one multitone simulation scenario comprising at least one of, at least one multitone transient signal file describing the multitone transient signal, or one or more multitone signal attributes describing the tones in the simulation tone set.

17. A system for simulating a non-linear circuit comprising:
    a user interface for planning a multitoned simulation process;
    a processor or processors that execute instructions to cause the processor or processors to perform a set of acts, the acts comprising:
    constructing a tone set comprising a plurality of tones;

generating one or more tone subsets from the tone set by filtering according to at least an intermodulation property, the tone subsets comprising one or more of the tones that satisfy one or more properties;

selecting at least one simulation tone set from the tone subsets based at least on a predetermined characteristic of the non-linear circuit; and generating a multitone transient signal to facilitate a circuit simulation, the multitone transient signal comprising the tones in the simulation tone set.

18. The system of claim 17, further comprising determining at least one of, an amplitude, or a phase, of at least one of the tones in the simulation tone set.

19. The system of claim 18, wherein a second simulation tone set is selected based at least in part on one or more multitone simulation metrics, the multitone simulation metrics derived from one or more simulation results produced by the circuit simulation.

20. The system of claim 17, further comprising storing at least one multitone simulation scenario comprising at least one of, at least one multitone transient signal file describing the multitone transient signal, or one or more multitone signal attributes describing the tones in the simulation tone set.

* * * * *